US007672665B2

(12) United States Patent
Sobb et al.

(10) Patent No.: US 7,672,665 B2
(45) Date of Patent: Mar. 2, 2010

(54) METHOD FOR USER INFORMATION TRANSFER

(75) Inventors: Christopher A. Sobb, Toledo, OH (US); Garett W. Gould, Troy, MI (US); William E. Italia, Howell, MI (US); Dennis M. Bodrie, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1379 days.

(21) Appl. No.: 11/087,357

(22) Filed: Mar. 23, 2005

(65) Prior Publication Data

US 2006/0217109 A1 Sep. 28, 2006

(51) Int. Cl.

| | |
|---|---|
| ***H04M 3/00*** | (2006.01) |
| ***H04M 1/00*** | (2006.01) |
| ***G05D 1/00*** | (2006.01) |
| ***B60R 22/00*** | (2006.01) |
| ***E05F 15/00*** | (2006.01) |
| ***G05D 3/00*** | (2006.01) |

(52) U.S. Cl. .................... 455/419; 455/550.1; 455/551; 455/569.2; 701/49

(58) Field of Classification Search ................. 455/445, 455/419, 550.1, 551, 552.1, 569.2; 701/32-36, 701/49

See application file for complete search history.

(56) References Cited

U.S. PATENT DOCUMENTS

| | | | | |
|---|---|---|---|---|
| 6,505,780 | B1 | 1/2003 | Yassin et al. | |
| 2003/0078709 | A1 * | 4/2003 | Yester et al. | 701/36 |
| 2003/0144005 | A1 * | 7/2003 | Videtich | 455/456 |
| 2004/0023647 | A1 * | 2/2004 | Mazzara et al. | 455/419 |
| 2005/0153741 | A1 * | 7/2005 | Chen et al. | 455/558 |
| 2006/0038447 | A1 * | 2/2006 | Bruelle-Drews | 307/10.1 |
| 2006/0178166 | A1 * | 8/2006 | Luu et al. | 455/558 |

OTHER PUBLICATIONS

U.S. Appl. No. 11/091,175, filed Mar. 28, 2005, Oesterling et al.

* cited by examiner

*Primary Examiner*—George Eng
*Assistant Examiner*—Wesley L Kim
(74) *Attorney, Agent, or Firm*—Dierker & Associates, P.C.

(57) ABSTRACT

A method for transferring user specific information from a first vehicle in a mobile communication system to a second vehicle in the mobile communication system includes retrieving user specific information from the vehicle using a wireless connection, transferring the retrieved information to the second vehicle, and deactivating the user specific information in the first vehicle.

12 Claims, 11 Drawing Sheets

400

500

800

900

METHOD FOR USER INFORMATION TRANSFER

FIELD OF THE INVENTION

The present invention generally relates to user information transfer in a mobile vehicle communication system.

BACKGROUND OF THE INVENTION

Currently, there is no automated way to transfer customer specific hardware information, such as a subscriber's mobile dialing number ("MDN"), geographic home location, Electronic Serial Number ("ESN") personal calling minutes (such as personal calling minutes) remaining, expiration date of the calling minutes, etc., to the hardware of a new vehicle enrolled in a mobile vehicle communication system ("MVCS") from the hardware of an old or previous vehicle in the MVCS. Subscribers are required to request a new telephone number and forfeit previous personal calling minutes when they purchase a new vehicle equipped with the same MVCS. Such transfers are labor intensive and time consuming, and often present considerable inconvenience to both the subscriber and the network operator.

Under some billing systems, only a single MDN may be associated with a ESN. Such an arrangement is convenient for billing purposes.

The present method advances the state of the art in mobile vehicle communication systems.

SUMMARY OF THE INVENTION

One aspect of the present invention provides a method for transferring user specific information from a first vehicle in a mobile communication system to a second vehicle in the mobile communication system. The method includes retrieving user specific information from the vehicle using a wireless connection and transferring the retrieved information to the second vehicle. The method further includes deactivating the user specific information in the first vehicle.

Another aspect of the present invention provides a system for transferring user specific information from a first vehicle in a mobile communication system to a second vehicle in the mobile communication system. The system includes means for retrieving user specific information from the vehicle using a wireless connection and means for transferring the retrieved information to the second vehicle. The system further includes means for deactivating the user specific information in the first vehicle.

Another aspect of the present invention provides a computer readable medium storing computer readable code for transferring user specific information from a first vehicle in a mobile communication system to a second vehicle in the mobile communication system. The medium includes computer readable code for retrieving user specific information from the vehicle using a wireless connection and computer readable code for transferring the retrieved information to the second vehicle. The medium further includes computer readable code for deactivating the user specific information in the first vehicle.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

DETAILED DESCRIPTION OF THE DRAWINGS

Figure 1:
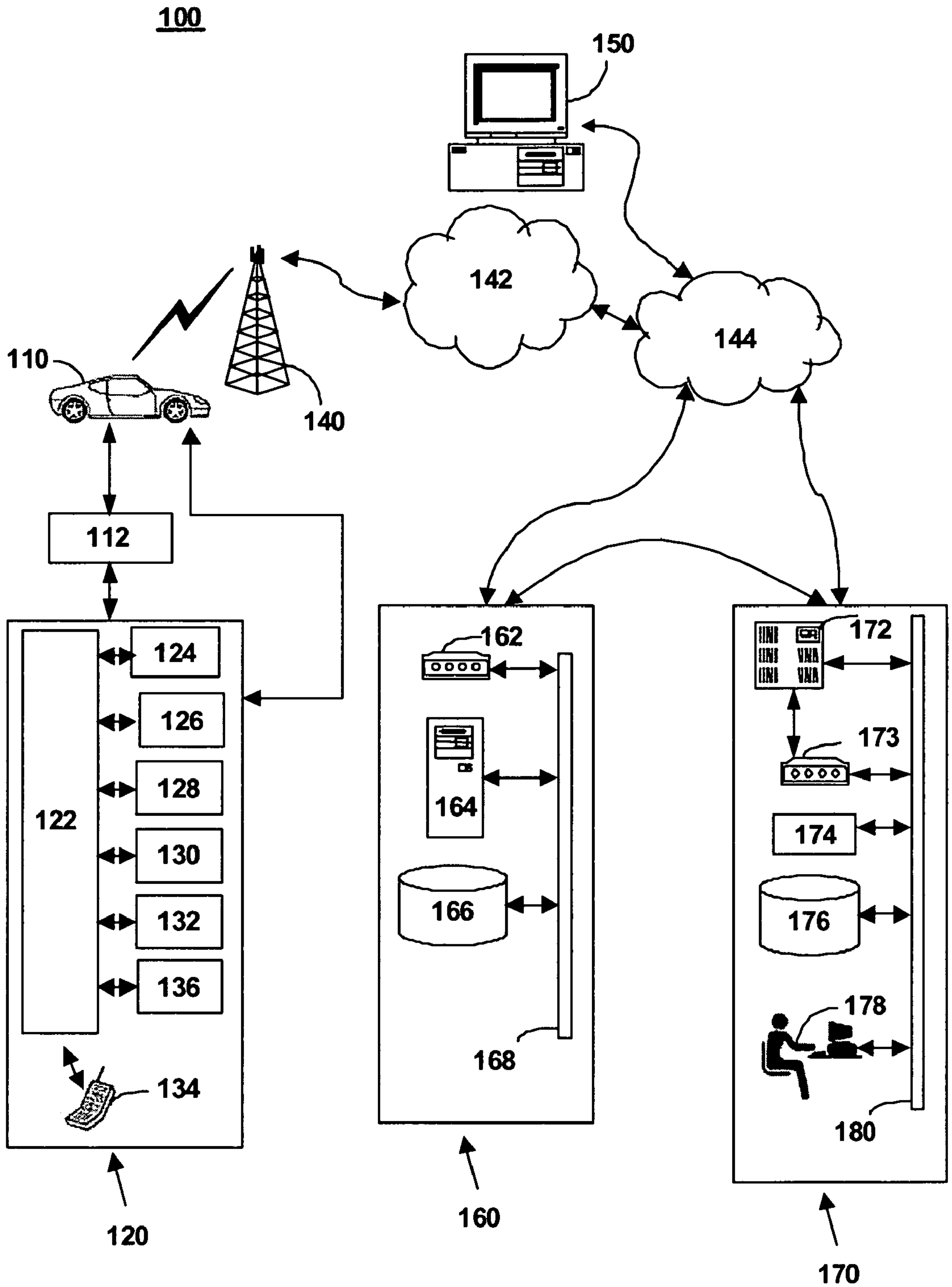
FIG. 1 illustrates an operating environment for a system for controlling vehicle modules as known in the art.

FIG. 1 illustrates one embodiment of a mobile vehicle communication system ("MVCS") 100 for controlling vehicle modules. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode or multi-band cellular phone.

Processor 122 executes various computer programs that control programming and operational modes of electronic and mechanical systems within MVCU 1 10. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 (or by a device in communication with telematics unit 120) located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol, and transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160. In one embodiment, computer 150 is used to create a text message input. In one embodiment, computer 150 is used to create a nametag to be associated with a text message input. In one embodiment, computer 150 is used to create a recipient nametag.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180. In one embodiment, modem 173 is in communication with at least one of network systems 180 and switch 172, and is configured for receiving inbound or sending outbound data communications to and from the call center 170.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
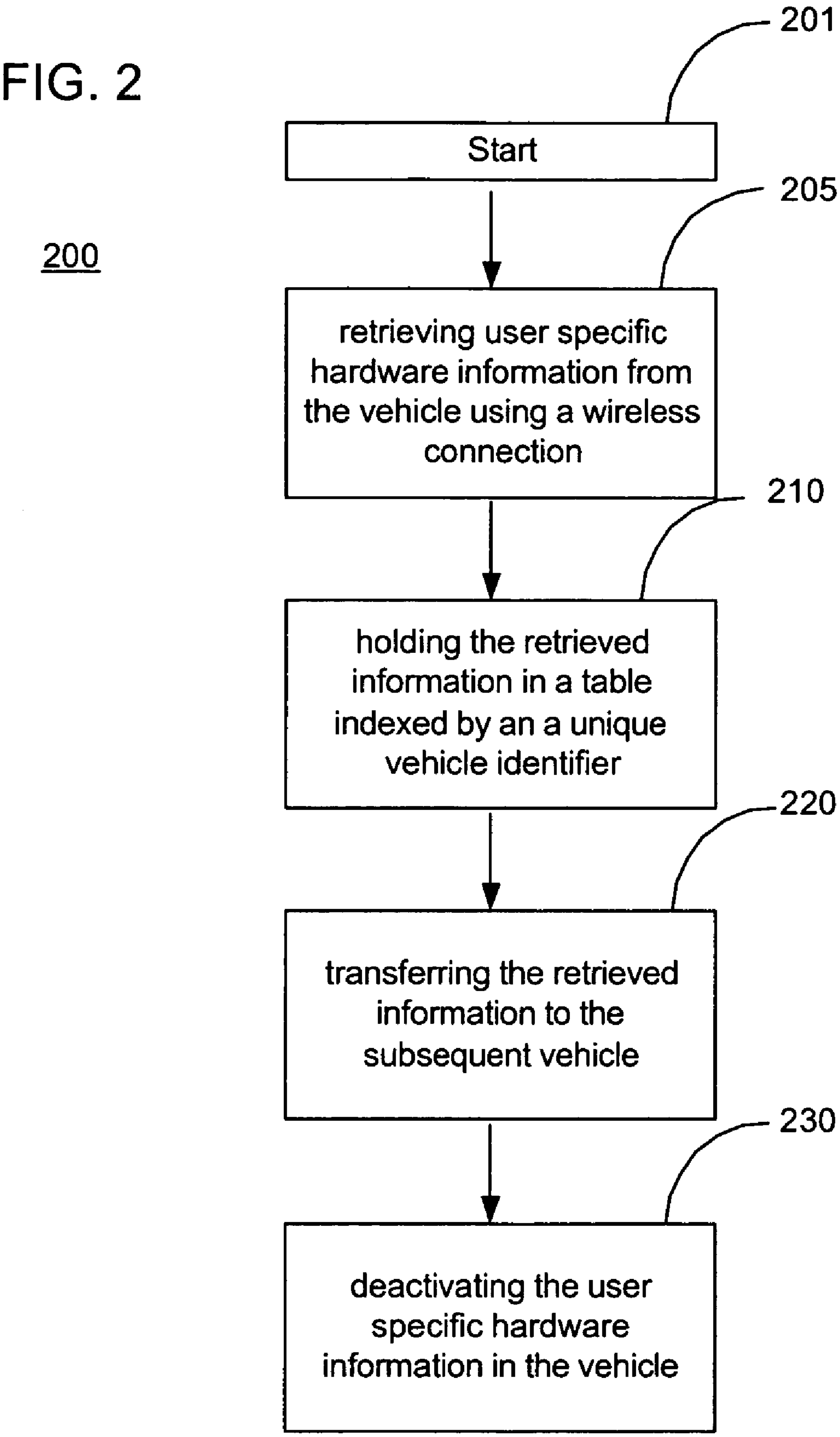
FIG. 2 illustrates one embodiment of a method to transfer user specific information, in accordance with the invention.

FIG. 2 illustrates one embodiment of a method 200 for transferring user specific information from a first vehicle in a mobile communication system to a second vehicle in the mobile communication system. Method 200 starts at step 201.

At step 205, user specific information is retrieved from the first vehicle using a wireless connection. In one embodiment, user specific information includes MDN, ESN, personal calling minutes, an expiration date for personal calling minutes, or a NPA-XXX indication. MDN information, in one embodiment, is obtained from a database maintained in the call center. User specific information, in other embodiments, includes pre-set information such as radio stations, seat position presets, climate control settings and the like.

At step 210, the retrieved information is stored in a table and indexed by a unique vehicle identifier. In one embodiment, the unique vehicle identifier is the ESN. In another embodiment, the unique vehicle identifier is a Vehicle Identification Number (VIN). In another embodiment, the unique vehicle identifier is the MIN. In one embodiment, the table is stored at a call center, such as call center 170 described in FIG. 1. In another embodiment, a wireless network operator maintains the table.

The retrieved information is transferred to the second vehicle in step 220. In one embodiment, the retrieved information is transferred via a wireless network to a telematics unit of the second vehicle. In another embodiment, the retrieved information is transferred to the second vehicle with a scan tool device. In one embodiment, transferring the retrieved information includes change in geographic location information from the vehicle to the second vehicle.

The user specific information in the first vehicle is deactivated in step 230. In one embodiment, deactivating the user specific information includes erasing the user specific hardware information. In another embodiment, deactivating the user specific information includes overwriting the information with a predetermined 'null' value, such as zero.

In another embodiment, deactivating the user specific information includes sending an electronic serial number ("ESN") change request to a wireless carrier requesting the wireless carrier change the ESN of the second vehicle. As used herein, changing the ESN comprises changing the holding table associating the ESN with the MDN of the first vehicle to associate the MDN of the first vehicle with the ESN of the second vehicle. In one embodiment, the electronic serial number change request includes the hardware type of the first and second vehicles, the previous electronic serial number, the new hardware type, the new electronic serial number, and the mobile dialing number. A pending vehicle request for the second vehicle is created based upon information contained in a holding table and the pending vehicle request is placed in a queue. The ESN change request is processed by the wireless carrier system, communication network or land network and a successful electronic serial number change response including the new ESN is sent to a call center. In response to the successful ESN change, the call center matches the new ESN with the pending vehicle request queue. After the new ESN is matched with the appropriate vehicle, the call center sends the transferred user specific information from the first vehicle to the second vehicle using a wireless network.

Figure 3:
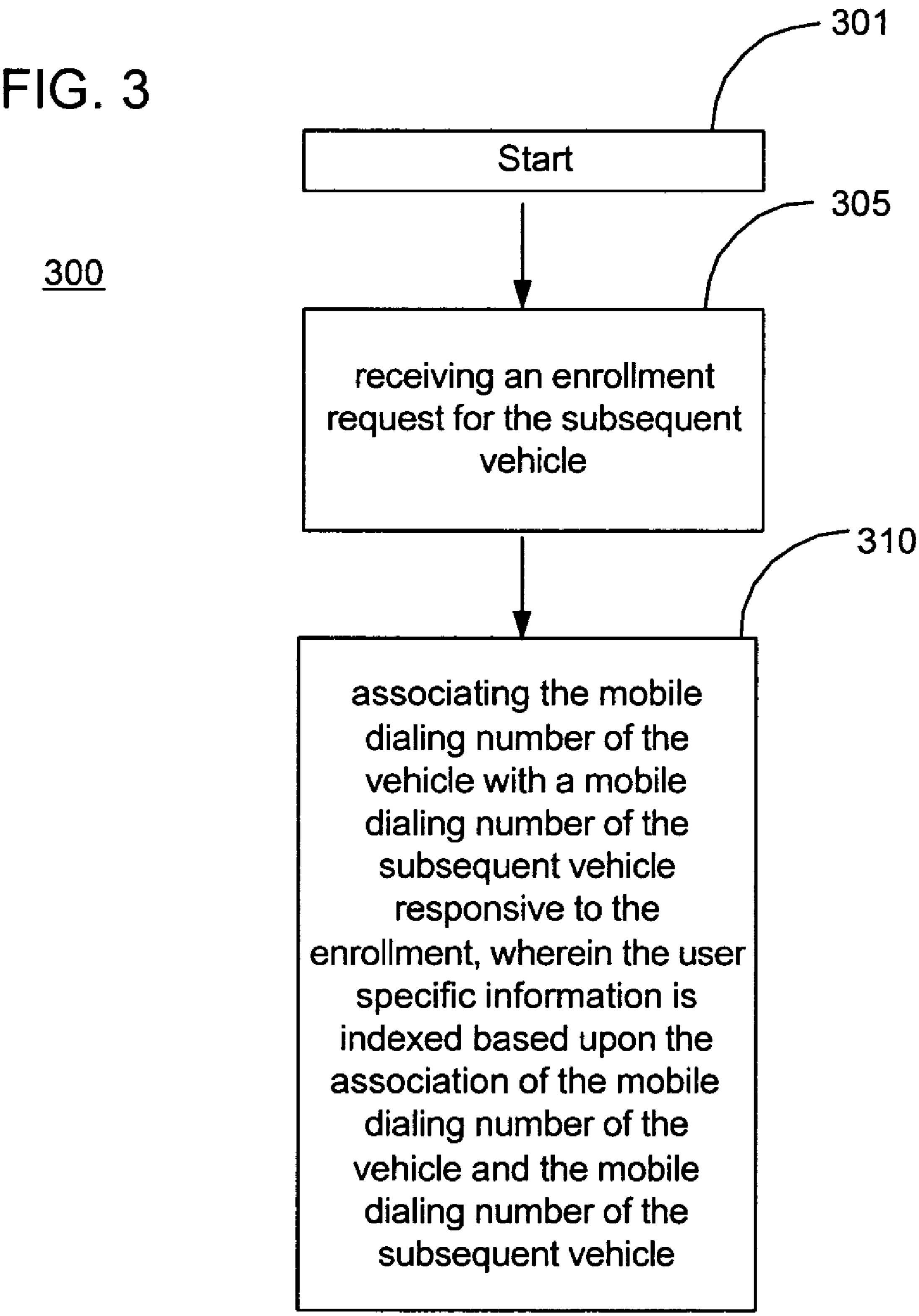
FIG. 3 illustrates one embodiment of a method to transfer user specific information, in accordance with the invention.

Another embodiment of a method 300 for transferring user specific information from a first vehicle in a mobile communication system to a second vehicle in the mobile communication system is illustrated in FIG. 3. Method 300 is implemented as method 200 with additional steps, and starts at step 301.

An enrollment request for the second vehicle is received at step 305. In one embodiment, the request is received at a call center 170 as described with reference to FIG. 1. In another embodiment, the enrollment request is received by a wireless network.

The mobile dialing number of the first vehicle is associated with the mobile dialing number of the second vehicle responsive to the enrollment in step 310. In implementing the association, the user specific information is indexed in a table based upon the association of the mobile dialing number of the first vehicle and the mobile dialing number of the second vehicle.

In another embodiment, the user specific information from the first vehicle is indexed to a mobile dialing number associated with the second vehicle in a database. In yet another embodiment, the geographic location of the first and second vehicles is determined in order to determine whether a change in geographic location of the second vehicle, relative to the location of the first vehicle is warranted. In one embodiment, the geographic location of the first and second vehicles is determined by GPS signals. In such an example, telematics units in both the first and second vehicles poll a GPS device in communication with the respective telematic units to determine a GPS location. The determined GPS location of each vehicle is then sent to the call center via a wireless connection by the telematics unit to determine the need for a change of the MDN.

Figure 4:
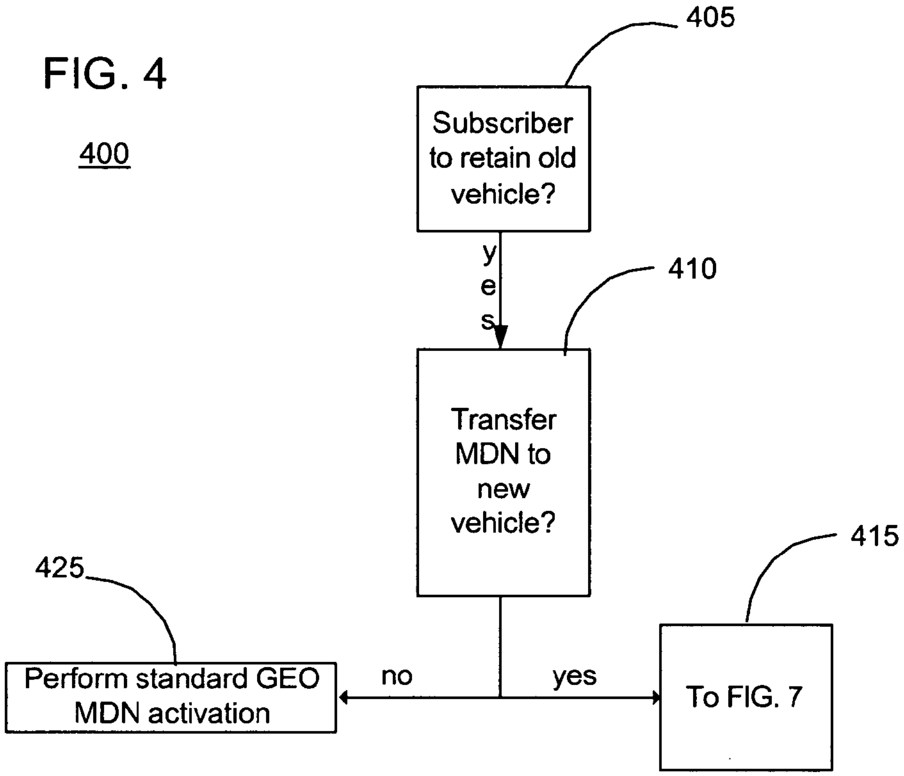
FIG. 4 illustrates one embodiment of a method to transfer user specific information, in accordance with the invention.
Figure 5:
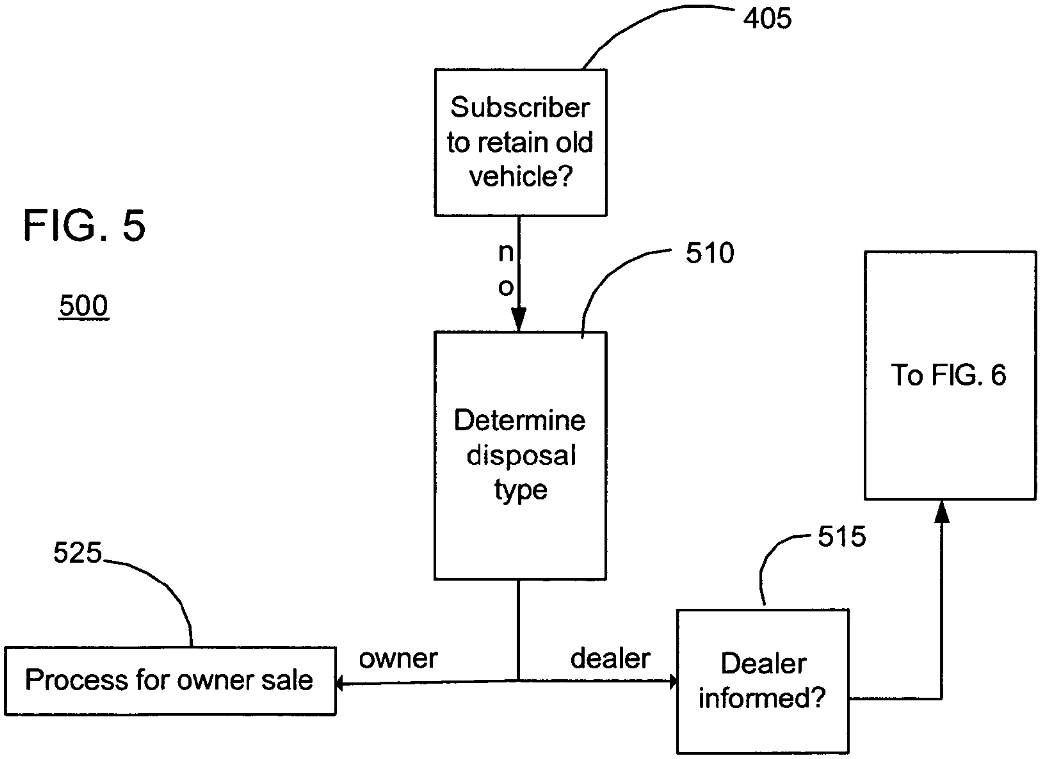
FIG. 5 illustrates one embodiment of a method to transfer user specific information, in accordance with the invention.

FIGS. 4 and 5 illustrate embodiments of methods 400 and 500 in accordance with one aspect of the invention. Method 400 begins at 405 with a determination whether a subscriber will retain the first vehicle. If yes, method 400 proceeds, while if no, method 500 proceeds.

Method 400 continues at step 410 to determine if the first MDN, also called MDN1, is to be transferred to a new vehicle. If MDN1 is not to be transferred, i.e. step 425, a standard MDN initiation results. However, if MDN1 is to be transferred to the new vehicle, method 400 proceeds to method 700 of FIG. 7 (described below) at step 415.

Method 500 begins at step 405, and continues to determine a disposal type for the first vehicle. In the event that the vehicle owner will dispose of the vehicle without dealer involvement, step 525, and method 500 processes the vehicle for owner sale and deactivates the telematics unit of the first vehicle. In the event that the dealer is to dispose of the vehicle, method 500 proceeds to step 515, and then to method 600 of FIG. 6 described below.

Figure 6:
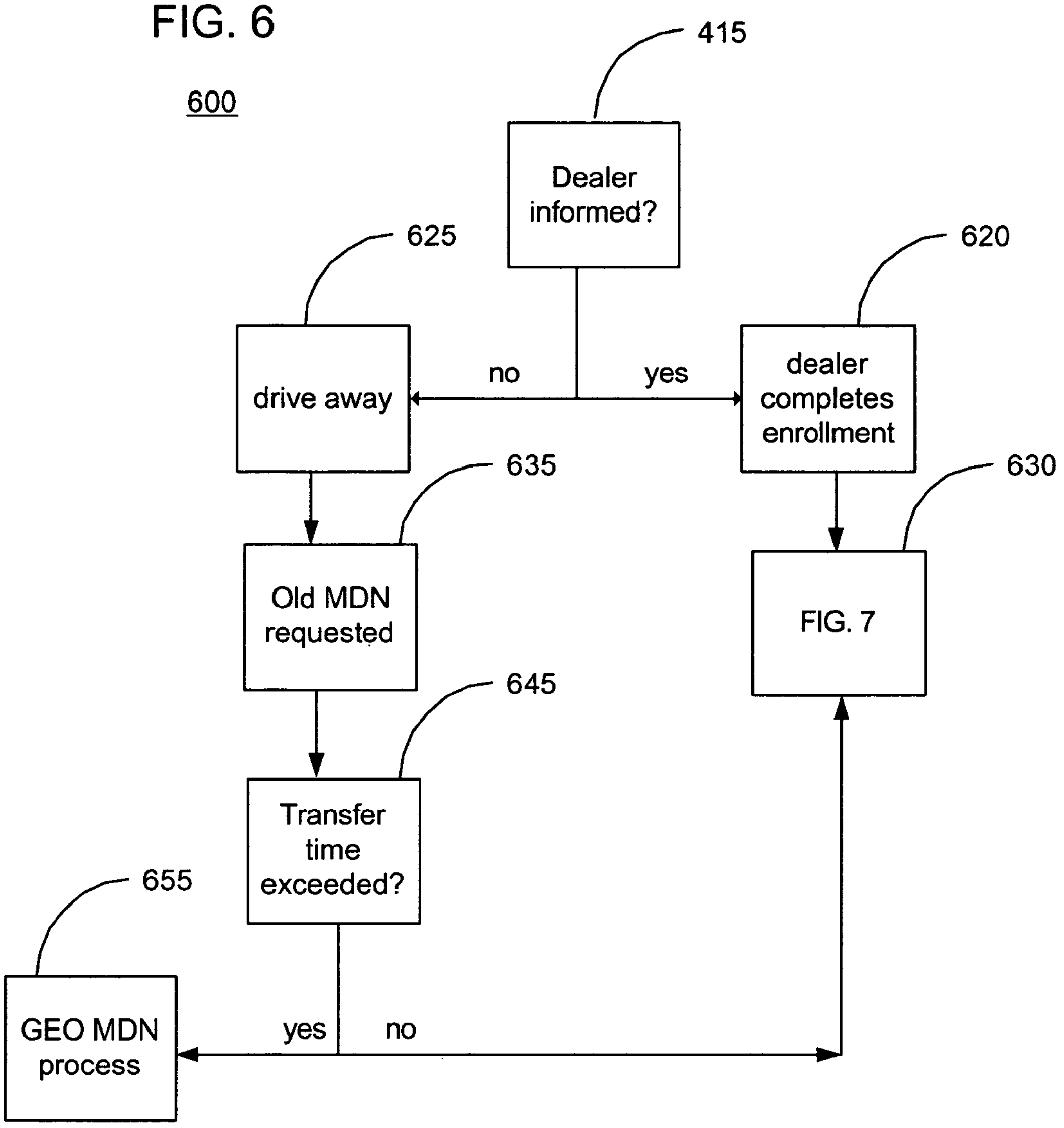
FIG. 6 illustrates one embodiment of a method to transfer user specific information, in accordance with the invention.

FIG. 6 illustrates one embodiment of a method 600 for determining a MDN transfer process in accordance with one aspect of the invention. Method 600 begins at step 415 of method 400, and determines if the dealer has been informed, and if so, the dealer completes the enrollment at step 620 by proceeding to method 700 of FIG. 7, described below.

However, if at step 415 the dealer is not informed of their involvement, i.e. the owner drives away at 625, a request for the old MDN is received at step 635. In one embodiment, a transfer time is predetermined, after which time, an MDN cannot be transferred. For example, a MDN is reassigned to a new subscriber after a predetermined period of time. Having received the old MDN request, it must be determined whether this transfer time has been exceeded, and if so, at step 655, a standard MDN request process is executed. In one embodiment, a user may request issuance of MDN1, although MDN1 may have been reassigned to a different user.

In contrast, however, if the transfer time has not been exceeded, at step 630, method 600 proceeds to method 700 of FIG. 7 described below.

Figure 7:
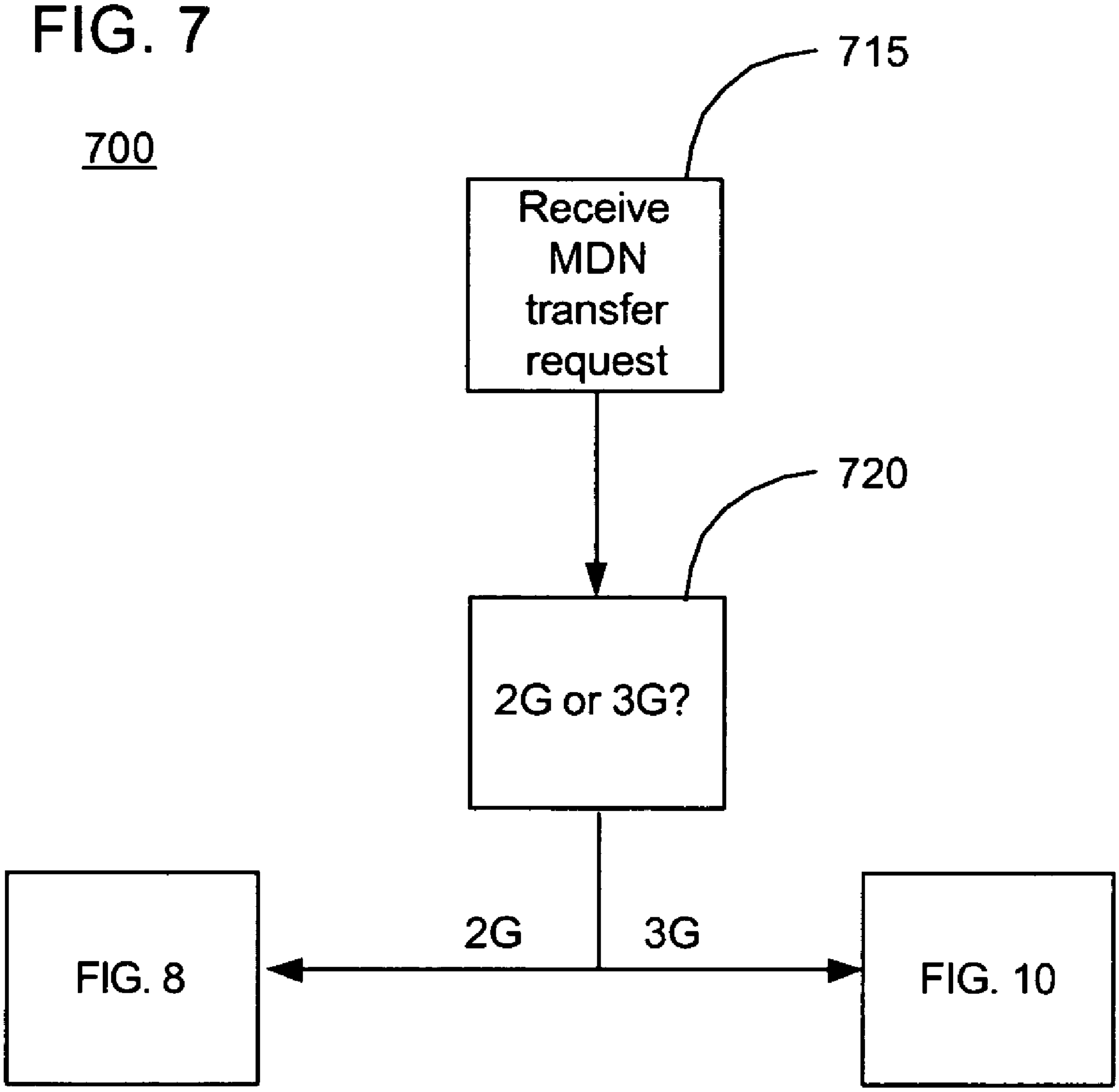
FIG. 7 illustrates one embodiment of a method to transfer user specific information, in accordance with the invention.
Figure 10:
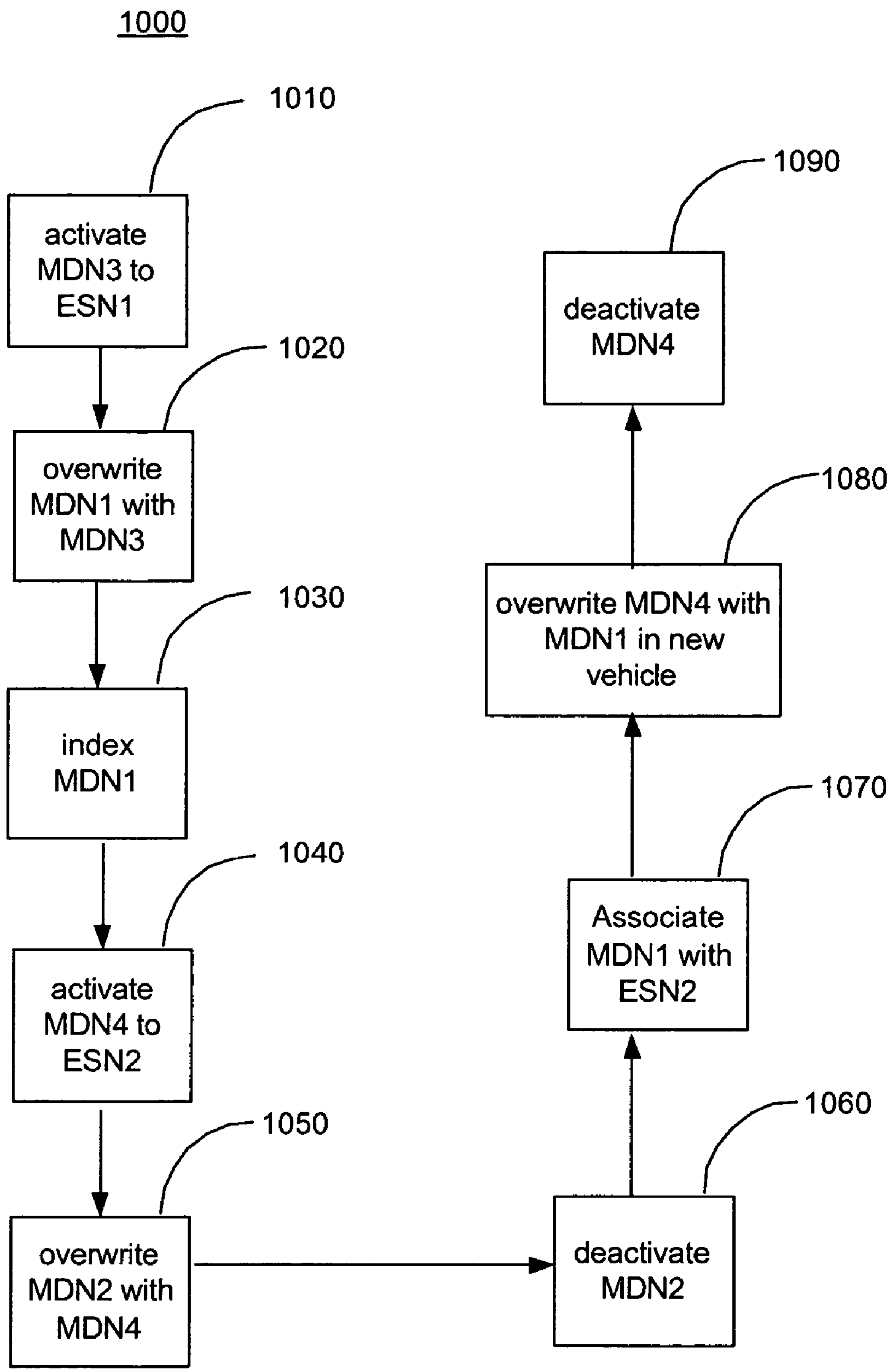
FIG. 10 illustrates one embodiment of a method to transfer user specific information, in accordance with the invention.
Figure 11:
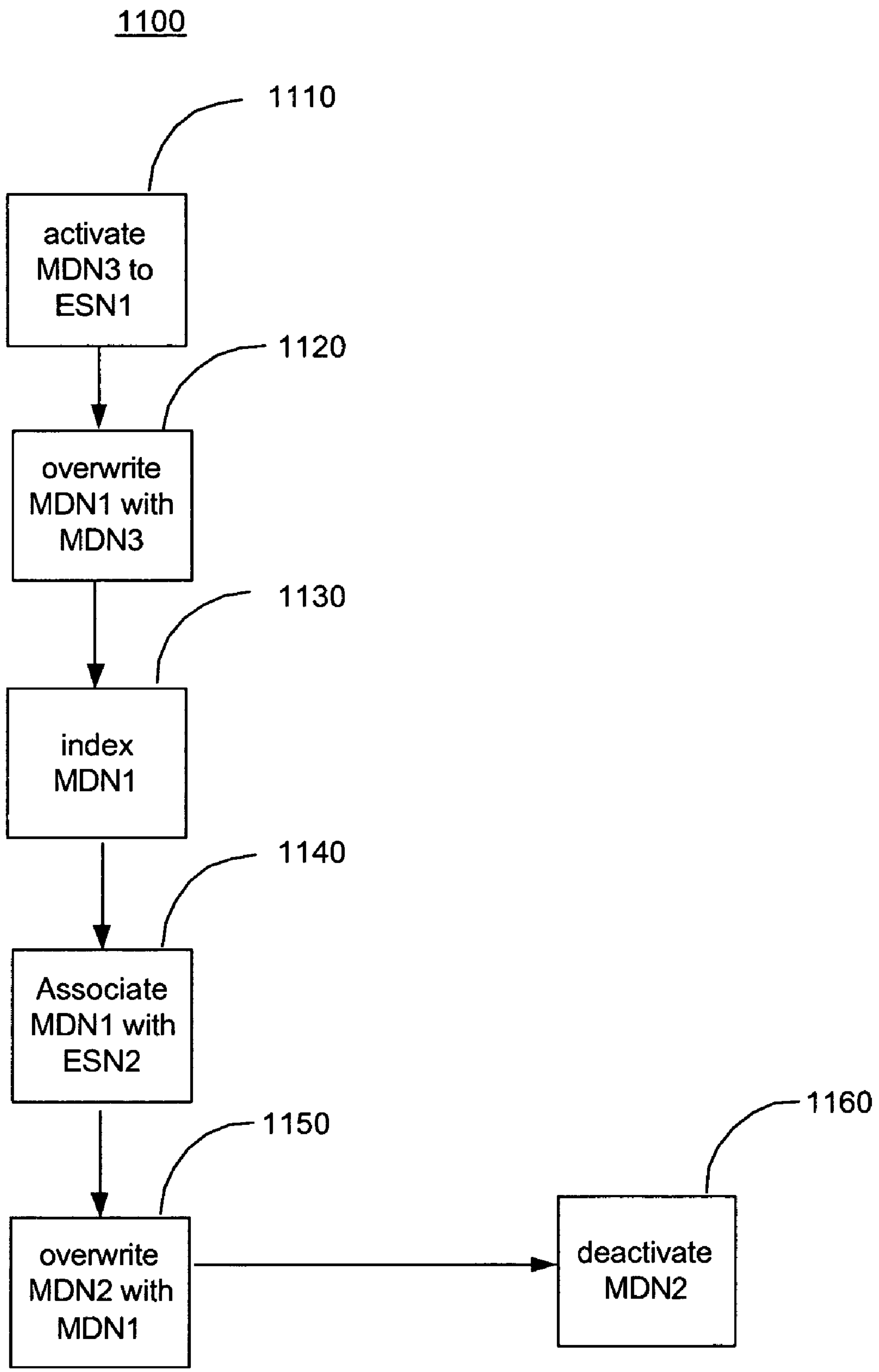
FIG. 11 illustrates one embodiment of a method to transfer user specific information, in accordance with the invention.

FIG. 7 illustrates one embodiment of a method 700 for determining a MDN transfer method in accordance with one aspect of the invention. Method 700 begins at 715 by receiving a MDN transfer request. After receiving the request, method 700 determines which of two transfer methods to utilize for the transfer—the methods are termed the "2G" or "3G" method herein. A 2G method, described in method 1100 of FIG. 11, is used for billing systems that allow more than one MDN to be assigned to an ESN, wherein 2G represents 2 discrete geographic MDN's. A 3G method, described in method 1000 of FIG. 10, is used for billing systems that do not allow such a transfer, wherein 3G represents 3 discrete geographic MDN's.

Figure 8:
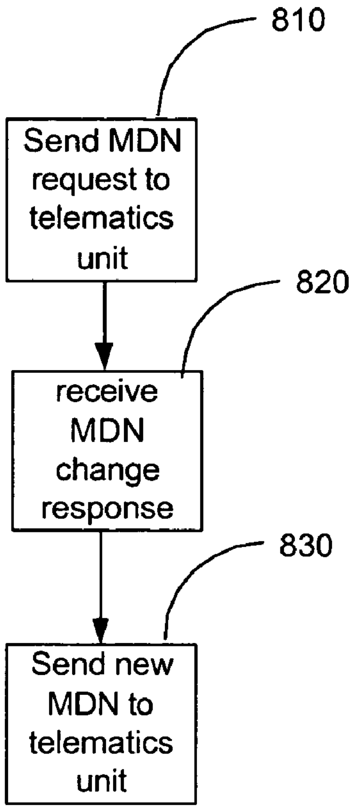
FIG. 8 illustrates one embodiment of a method to transfer user specific information, in accordance with the invention.
Figure 9:
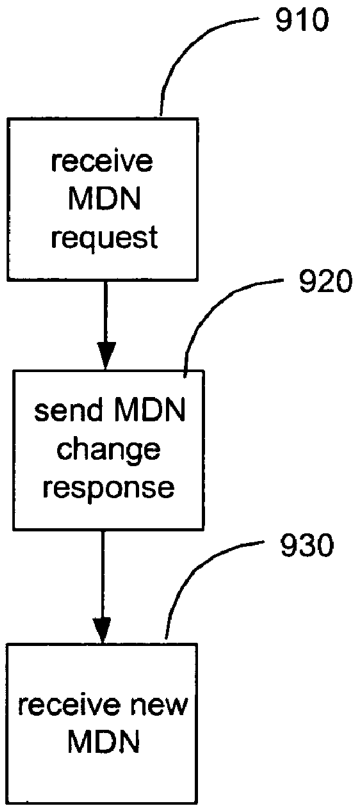
FIG. 9 illustrates one embodiment of a method to transfer user specific information, in accordance with the invention.

FIG. 8 illustrates one embodiment of a method 800 for sending a new MDN to a telematics unit in accordance with one aspect of the invention. Method 800 begins at step 810 by sending a MDN request to a telematics unit. In one embodiment, the request is issued via a wireless connection. In another embodiment, the request is issued via a subcarrier of a satellite radio broadcast. In yet another, the MDN request is issued to a database maintained in communication with the call center, but not within the vehicle. In one embodiment, the request is issued by a call center. In another embodiment, the request is issued by a dealer. A MDN request comprises a request for user specific information, such as, but not limited to, MDN, ESN, remaining personal calling minutes, preset information, and previously stored data. In one embodiment, the MDN is received via a wireless connection from the first vehicle. In another embodiment, the MDN is received from data stored at either the call center or a wireless network provider.

Method 800 continues at 820, and the requestor receives a MDN change response. In one embodiment, a MDN change response includes the information sought by the MDN request. In the event that a specific vehicle does not have particular information, a null value may be returned. A new MDN with associated information is sent to the telematics unit at step 830. In one embodiment, the new MDN is sent to a second vehicle.

Method 900 begins by receiving a MDN request at a telematics unit at 910. A MDN request comprises a request for user specific information, such as, but not limited to, MDN, ESN, remaining personal calling minutes, pre-set information, and previously stored data. Pre-set information, for example, includes pre-set buttons for a radio station. The MDN request may be received via a wireless network or via a subcarrier of a satellite radio broadcast. The MDN request includes a requestor identification to enable the information to be sent to the desired recipient.

Method 900 continues at 920, and the telematics unit sends a MDN change response to the requester. In one embodiment, a MDN change response includes the information sought by the MDN request. In the event that the vehicle does not have particular information, a null value is sent, in one embodiment. A new MDN with associated information is received at a telematics unit at step 930.

FIG. 10 illustrates one embodiment of a method 1000 for a 3G MDN transfer. Method 1000 begins by activating a third MDN ("MDN3") that is to be installed in the first vehicle at step 1010. MDN3 is activated to the ESN of the first vehicle ("ESN1"). MDN3 is obtained from an alternate billing system. Those of ordinary skill in the art are aware of methods for obtaining a MDN from the billing system of a wireless carrier.

The MDN of the first vehicle ("MDN1") is overwritten with MDN3, without deactivating MDN1, at step 1020. In one embodiment, MDN3 is transmitted via a wireless network or a satellite radio subcarrier to telematics unit of the first vehicle with an instruction to overwrite MDN1. As MDN1 has been overwritten, but not deactivated, MDN1 remains an active MDN but without an associated telematics unit.

MDN1 is indexed in a holding table at step 1030. In one embodiment, other user specific information is obtained from the first vehicle and stored in the holding table with MDN1. In one embodiment, step 1030 includes receiving a MDN change response, as described above with reference to step 820 of method 800. In one embodiment, the holding table is maintained at a call center. In one embodiment, the holding table is maintained as a portion of a database. The holding table may be indexed by any appropriate method. In one embodiment, the holding table is indexed by MDN. In another embodiment, the holding table is indexed by a unique vehicle identifier, such as a Vehicle Identification Number ("VIN").

An intermediary MDN ("MDN4") is activated to the ESN of the second vehicle (ESN2) at step 1040. The MDN of the second vehicle ("MDN2") is overwritten with MDN4 at step 1050. In one embodiment, MDN4 is transmitted via a wireless network or a satellite radio subcarrier to telematics unit of the second vehicle with an instruction to overwrite MDN2.

In response to overwriting MDN2, MDN2 is deactivated at step 1060. As MDN2 has been deactivated, ESN2 is now not associated with an active MDN. MDN1 is then associated with ESN2 at step 1070.

MDN4 is overwritten with MDN1 at the telematics unit of the second vehicle at step 1080. In one embodiment, step 1080 includes transmitting user specific information associated with MDN1 to the second vehicle, for example, as discussed with reference to step 830. MDN4 is deactivated at step 1090. In one embodiment, deactivating MDN4 includes deactivating or removing user specific information from the first vehicle. Deactivating user specific information, in one embodiment, includes overwriting the user specific information with a null value.

FIG. 11 illustrates one embodiment of a method 1100 for a 2G MDN transfer in accordance with one aspect of the invention.

Method 1100 begins by activating a third MDN ("MDN3") that is to be installed in the first vehicle at step 1110. MDN3 is activated to the ESN of the first vehicle ("ESN1"). MDN3 is obtained from an alternate billing system. Those of ordinary skill in the art are aware of methods for obtaining a MDN from the billing system of a wireless carrier.

The MDN of the first vehicle ("MDN1") is overwritten with MDN3, without deactivating MDN1, at step 1120. In one embodiment, MDN3 is transmitted via a wireless network or a satellite radio subcarrier to telematics unit of the first vehicle with an instruction to overwrite MDN1. As MDN1 has been overwritten, but not deactivated, MDN1 remains an active MDN but without an associated telematics unit.

MDN1 is indexed in a holding table at step 1130. In one embodiment, other user specific information is obtained from the first vehicle and stored in the holding table with MDN1. In one embodiment, step 1130 includes receiving a MDN change response, as described above with reference to step 820 of method 800. In one embodiment, the holding table is maintained at a call center. In one embodiment, the holding table is maintained as a portion of a database. The holding table may be indexed by any appropriate method. In one embodiment, the holding table is indexed by MDN. In another embodiment, the holding table is indexed by a unique vehicle identifier, such as a VIN.

MDN1 is associated with the ESN of the second vehicle (ESN2) at step 1140. The MDN of the second vehicle ("MDN2") is overwritten with MDN1 at step 1150. In one embodiment, MDN1 is transmitted via a wireless network or a satellite radio subcarrier to telematics unit of the second vehicle with an instruction to overwrite MDN2.

In response to overwriting MDN2, MDN2 is deactivated at step 1160. In one embodiment, deactivating MDN2 includes deactivating or removing user specific information from the first vehicle. Deactivating user specific information, in one embodiment, includes overwriting the user specific information with a null value.

Figure 12:
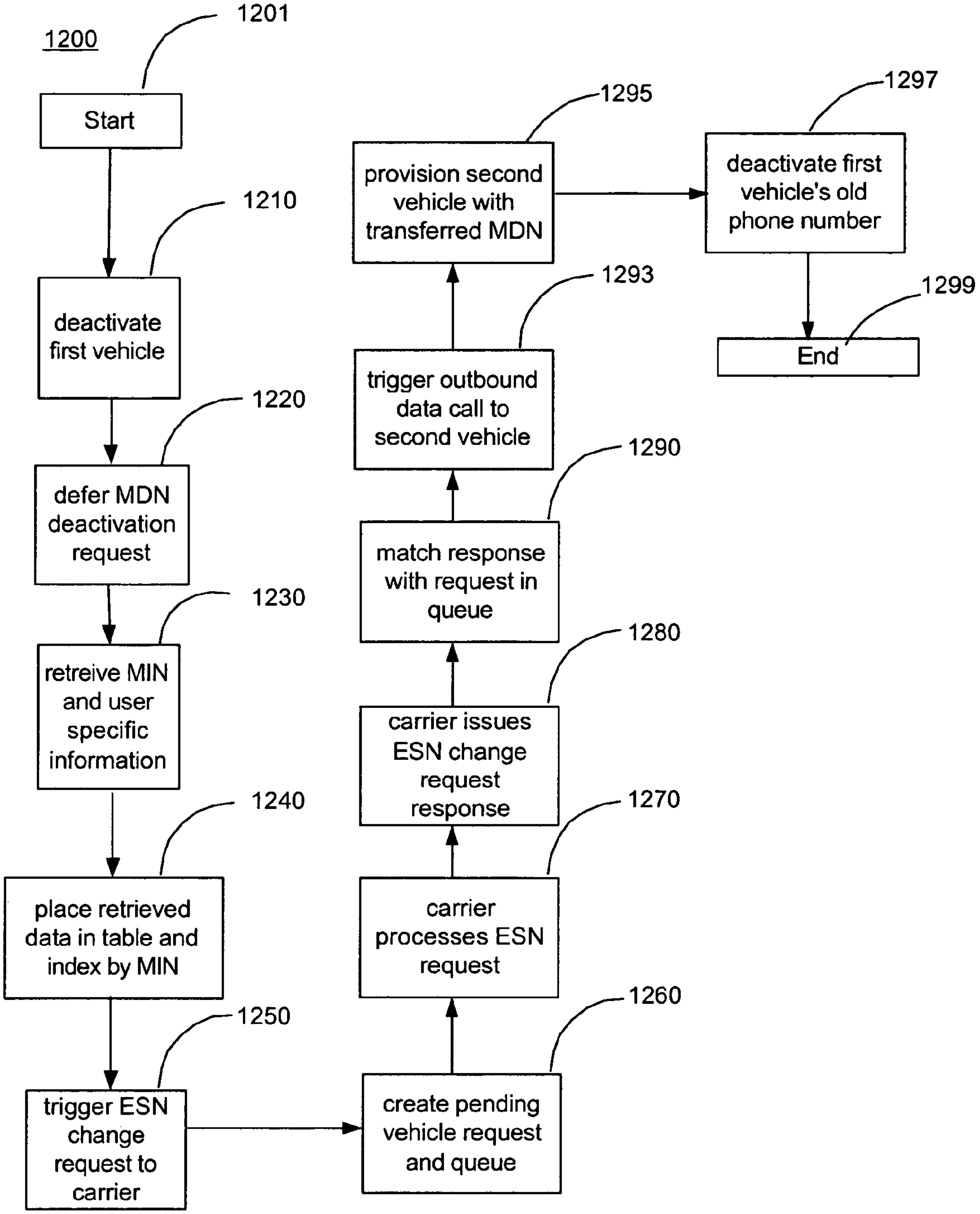
FIG. 12 illustrates another embodiment of a method to transfer user specific information, in accordance with one aspect of the invention.

FIG. 12 illustrates another embodiment of a method 1200 to transfer user specific information, in accordance with one aspect of the invention. Method 1200 begins at 1201 and deactivates the telematics unit of a first vehicle at step 1210. The MDN deactivation request is deferred at step 1220.

The MIN and user specific information are retrieved at step 1230. In one embodiment, the MIN is retrieved from a holding table at a call center. In another embodiment, the MIN is retrieved from a holding table at a wireless carrier. In yet another embodiment, the MIN is retrieved from the first mobile vehicle using a wireless connection. Other user specific information, including personal calling minutes, MDN, ESN, etc., is retrieved from the first mobile vehicle using a wireless connection. The retrieved data is placed into a holding table and indexed by MIN at step 1240.

Placing the retrieved data into a holding table triggers an ESN change request to the wireless carrier at step 1250, and a pending vehicle request is placed into a queue at step 1260. The wireless carrier processes the ESN change request at step 1270, and issues an ESN change request response at step 1280. When the ESN change request response is received, the ESN change request response is matched to a pending vehicle request in the queue (i.e. step 1260) at step 1290.

An outbound data call to the second vehicle is triggered in response to matching the ESN change request with the pending vehicle request at step 1293. The outbound data call results in provisioning the second vehicle with the transferred MDN at step 1295, and the first vehicle's MDN is deactivated at step 1297. Method 1200 ends at 1299.

Figure 13:
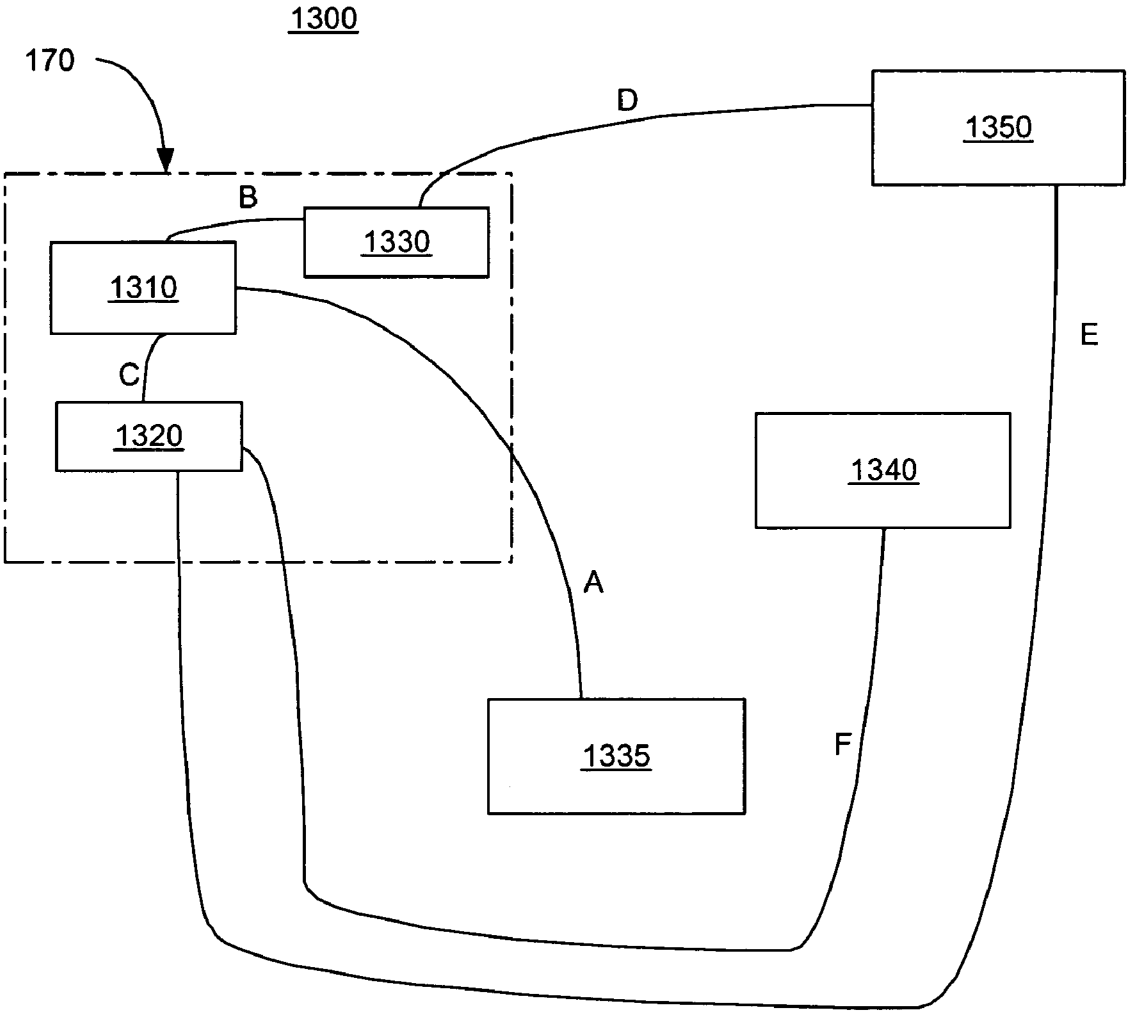
FIG. 13 illustrates a schematic diagram illustrating one embodiment of a method to transfer user specific information in accordance with one aspect of the invention.

FIG. 13 illustrates a schematic diagram illustrating one embodiment of a method to transfer user specific information in accordance with one aspect of the invention at 1300. Method 1300 illustrates the relationship between call center 170, first vehicle 1335, second vehicle 1340, and a wireless carrier 1350. At method step A, data is retrieved relating to first vehicle 1335 and received in a holding table 1310 at call center 170. Data may be retrieved directly from the vehicle using a wireless connection, or from a data repository such as a database within the call center.

Next, at step B, a request is generated to make the retrieved MDN active with respect to a ESN associated with second vehicle 1340 rather than first vehicle 1335. This request is sent to the wireless carrier 1350 at step D. Additionally, a pending activation request is placed in a pending activation queue 1320 at the call center at step C. In one embodiment, steps B and C occur substantially simultaneously.

When the wireless carrier receives the ESN change request, the wireless carrier changes the ESN associated with the MDN so that the ESN of the second vehicle becomes associated with the MDN at step E. The wireless carrier reports the swap at step E, and confirms the swap, triggering a match of the data, and transferring the holding table data to the second vehicle 1340 at step F.

The present invention may be embodied in other specific forms without departing from its spirit or essential characteristics. The described embodiments are to be considered in all respects only as illustrative and not restrictive.

What is claimed is:

1. A method for wirelessly transferring user specific information from a first vehicle in a mobile communication system to a second vehicle in the mobile communication system, the method comprising:
- retrieving, via a first wireless data connection, user specific information from the first vehicle;
- transferring, via a second wireless data connection, the retrieved information to the second vehicle; and
- deactivating, via the first wireless data connection, the user specific information in the first vehicle either by erasing the user specific information or overwriting the user specific information with a predetermined null value;
- wherein the user specific information comprises system identification, mobile dialing number, geographic location information, personal calling minutes remaining, pre-set information, previously stored data and expiration date of the personal calling minutes.

2. The method of claim 1, further comprising:
- indexing the user specific information to a mobile dialing number associated with the second vehicle in a database.

3. The method of claim 1, wherein at least one of the first or second wireless data connections comprises a satellite radio broadcast.

4. The method of claim 1 wherein retrieving, transferring, and deactivating are accomplished other than by using a physically removable and transferable memory module.

5. A method for wirelessly transferring user specific information from a first vehicle in a mobile communication system to a second vehicle in the mobile communication system, the method comprising:
- retrieving, via a first wireless data connection, user specific information, including a mobile dialing number (MDN) of the first vehicle, from the first vehicle; and
- transferring, via a second wireless data connection, the retrieved information to the second vehicle by:
  - activating an intermediary mobile dialing number (MDN) to a telematics unit of the second vehicle;
  - overwriting a preexisting MDN of the second vehicle with the intermediary MDN;
  - deactivating the preexisting MDN of the second vehicle;
  - overwriting the intermediary MDN with the MDN of the first vehicle;
  - deactivating the intermediary MDN; and
  - deactivating the user specific information in the first vehicle.

6. A system for wirelessly transferring mobile dialing number (MDN) information, comprising:
- means for sending, via a first wireless data connection, a request for user specific information to a first subscriber vehicle;
- means for receiving, via the first wireless data connection, the user specific information; and
- means for transferring, via a second wireless data connection, the user specific information to a second vehicle, the means for transferring including:
  - means for wirelessly activating an intermediary MDN to a telematics unit of the second vehicle;
  - means for wirelessly overwriting a preexisting MDN of the second vehicle with the intermediary MDN;

means for wirelessly deactivating the preexisting MDN of the second vehicle;

means for wirelessly overwriting the intermediary MDN with an MDN of the first vehicle; and means for wirelessly deactivating the intermediary MDN.

7. The system of claim 6, further comprising:

means for wirelessly enrolling the second vehicle; and means for wirelessly associating the mobile dialing number (MDN) of the first vehicle with an MDN of the second vehicle responsive to the enrollment.

8. The system of claim 6, further comprising:

means for wirelessly associating the user specific information based upon the mobile dialing number (MDN) of the first vehicle and the preexisting MDN of the second vehicle.

9. A computer readable medium including a program for wirelessly transferring user specific mobile dialing number information from a first vehicle to a second vehicle, comprising:

computer readable code for retrieving, via a first wireless data connection, user specific information from the first vehicle using a wireless connection;

computer readable code for transferring, via a second wireless data connection, the retrieved user specific information to the second vehicle, the computer readable code for transferring including:

computer readable code for wirelessly activating an intermediary mobile dialing number (MDN) to a telematics unit of the second vehicle;

computer readable code for wirelessly overwriting a preexisting MDN of the second vehicle with the intermediary MDN;

computer readable code for wirelessly deactivating the preexisting MDN of the second vehicle;

computer readable code for wirelessly overwriting the intermediary MDN with an MDN of the first vehicle;

computer readable code for wirelessly deactivating the intermediary MDN; and computer readable code for wirelessly deactivating the user specific information in the first vehicle.

10. A computer readable medium including a program for wirelessly transferring user specific mobile dialing number (MDN) information from a first vehicle to a second vehicle, comprising:

computer readable code for retrieving, via a first wireless data connection, user specific information from the first vehicle;

computer readable code for transferring, via a second wireless data connection, the retrieved user specific information to the second vehicle; and computer readable code for deactivating, via the first wireless data connection, the user specific information in the first vehicle either by erasing the user specific information or overwriting the user specific information with a predetermined null value;

wherein the user specific information comprises system identification, mobile dialing number (MDN), geographic location information, personal calling minutes remaining, pre-set information, previously stored data and expiration date of the personal calling minutes.

11. The computer readable medium of claim 10, further comprising:

computer readable code for holding mobile dialing number (MDN) information in a table indexed by an a unique vehicle identifier; and a computer readable code for deactivating the user specific information in the first vehicle.

12. A method for wirelessly transferring user specific information from a first vehicle in a mobile communication system to a second vehicle in the mobile communication system, the method comprising:

initiating a wireless data call with a telematics unit of the first vehicle to retrieve at least a mobile dialing number (MDN) of the first vehicle and to deactivate the telematics unit;

associating the retrieved MDN with a mobile identification number of the first vehicle;

placing the retrieved MDN and the mobile identification number of the first vehicle in a holding table, thereby triggering transmission of 1) an electronic serial number (ESN) change request to a wireless carrier and 2) a pending vehicle request, based on the information in the holding table, for the second vehicle to a queue;

receiving, from the wireless carrier, a successful ESN change response;

matching the successful ESN change response to the pending vehicle request for the second vehicle;

in response to the matching, initiating an other wireless data call to the second vehicle to provision the second vehicle with the at least the MDN of the first vehicle; and wirelessly deactivating the MDN of the first vehicle.

* * * * *